(12) United States Patent
Pomaranski et al.

(10) Patent No.: US 7,072,788 B2
(45) Date of Patent: Jul. 4, 2006

(54) SYSTEM AND METHOD FOR TESTING AN INTERCONNECT IN A COMPUTER SYSTEM

(75) Inventors: Ken G. Pomaranski, Roseville, CA (US); Andrew H. Barr, Roseville, CA (US); Dale J. Shidla, Roseville, CA (US)

(73) Assignee: Hewlett-Packard Development Company, Houston, TX (US)

( * ) Notice: Subject to any disclaimer, the term of this patent is extended or adjusted under 35 U.S.C. 154(b) by 32 days.

(21) Appl. No.: 10/727,440

(22) Filed: Dec. 4, 2003

(65) Prior Publication Data

US 2005/0125187 A1 Jun. 9, 2005

(51) Int. Cl.
*G06F 19/00* (2006.01)

(52) U.S. Cl. ............... 702/121; 702/122; 702/123; 714/47; 714/738

(58) Field of Classification Search ......... 702/108, 702/117, 118, 119, 121, 122, 123, 120; 714/699, 714/733, 738, 715, 724, 25, 30, 47
See application file for complete search history.

(56) References Cited

U.S. PATENT DOCUMENTS

| 5,033,049 | A | 7/1991 | Keener et al. |
|---|---|---|---|
| 5,070,296 | A | 12/1991 | Priebe |
| 5,268,639 | A | 12/1993 | Gasbarro et al. |
| 5,442,644 | A | 8/1995 | Heflin et al. |
| 5,621,741 | A | 4/1997 | Kohiyama |
| 6,049,894 | A | 4/2000 | Gates |
| 6,182,248 | B1 | 1/2001 | Armstrong et al. |
| 6,195,772 | B1 | 2/2001 | Mielke et al. |
| 6,609,221 | B1 * | 8/2003 | Coyle et al. ............ 714/715 |
| 6,757,803 | B1 * | 6/2004 | Lin et al. ............... 711/170 |
| 6,965,648 | B1 * | 11/2005 | Smith et al. ............ 375/257 |
| 2004/0117708 | A1 * | 6/2004 | Ellis et al. ............. 714/733 |
| 2004/0117709 | A1 * | 6/2004 | Nejedlo et al. ......... 714/738 |

FOREIGN PATENT DOCUMENTS

| WO | WO 01/73459 | 10/2001 |
|---|---|---|
| WO | WO 01/84170 | 11/2001 |

OTHER PUBLICATIONS

A copy of GB Search Report for Appl No. GB0426284.6 mailed on Feb. 21, 2005 ( 3 pgs.).

* cited by examiner

*Primary Examiner*—Bryan Bui

(57) ABSTRACT

A computer system comprising an operating system, a first component that comprises a first test module, a second component that comprises a second test module, and an interconnect coupling the first component and the second component is provided. The first test module is configured to provide a first test pattern to the second test module on the interconnect in response to a first signal from the operating system.

17 Claims, 4 Drawing Sheets

SYSTEM AND METHOD FOR TESTING AN INTERCONNECT IN A COMPUTER SYSTEM

BACKGROUND

Computer systems generally include a number of components that are electrically connected to one another. These components include one or more processors, memory devices, input/output (I/O) devices, and controllers for the memory and I/O devices. Because the components can be contained in various types of housing, the connections between the components can take numerous forms. For example, components may be microchips that may plug into or be soldered into slots sockets on a motherboard. Components may also take the form of circuit boards that have edge connectors that plug into slots on the motherboard. In addition, components may be connected to a computer system using cables that connect components to connectors in the motherboard or into plugs in the chassis that houses the motherboard.

Regardless of the connection mechanism between two components in a computer system, a failure in a connection between two or more components may cause broader failures to occur in the system and possibly cause the system to crash. Although some diagnostic testing of interconnections between components may occur in response to a computer system being turned on or reset, this type of testing may not detect failures in computer systems that are left on and not reset for extended periods of time. In addition, certain failures of an interconnect may not appear without rigorous pattern testing of the interconnect. Interconnect failures that occur in computer systems during operation may not be detected until they cause undesirable results such as a crash.

Accordingly, it would be desirable to be able to detect interconnect failures between components in a computer system before the failures cause undesirable results during operation of the system.

SUMMARY

According to one exemplary embodiment, a computer system is provided that includes an operating system, a first component that comprises a first test module, a second component that comprises a second test module, and an interconnect coupling the first component and the second component. The first test module is configured to provide a first test pattern to the second test module on the interconnect in response to a first signal from the operating system.

DETAILED DESCRIPTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

In one aspect of the present disclosure, a computer system includes interconnect test modules configured to perform tests on an interconnect in the computer system. The interconnect test modules are included in components that are coupled to an interconnect. To test the interconnect, an interconnect test module causes the components coupled to the interconnect to be de-allocated from use by the computer system and then provides signals in the form of test patterns to a second interconnect test module. The second interconnect test module detects errors in response to receiving the test patterns. The second interconnect test module may also provide test patterns back to the first interconnect test module. If an error is detected in the interconnect, remedial action is performed.

Figure 1:
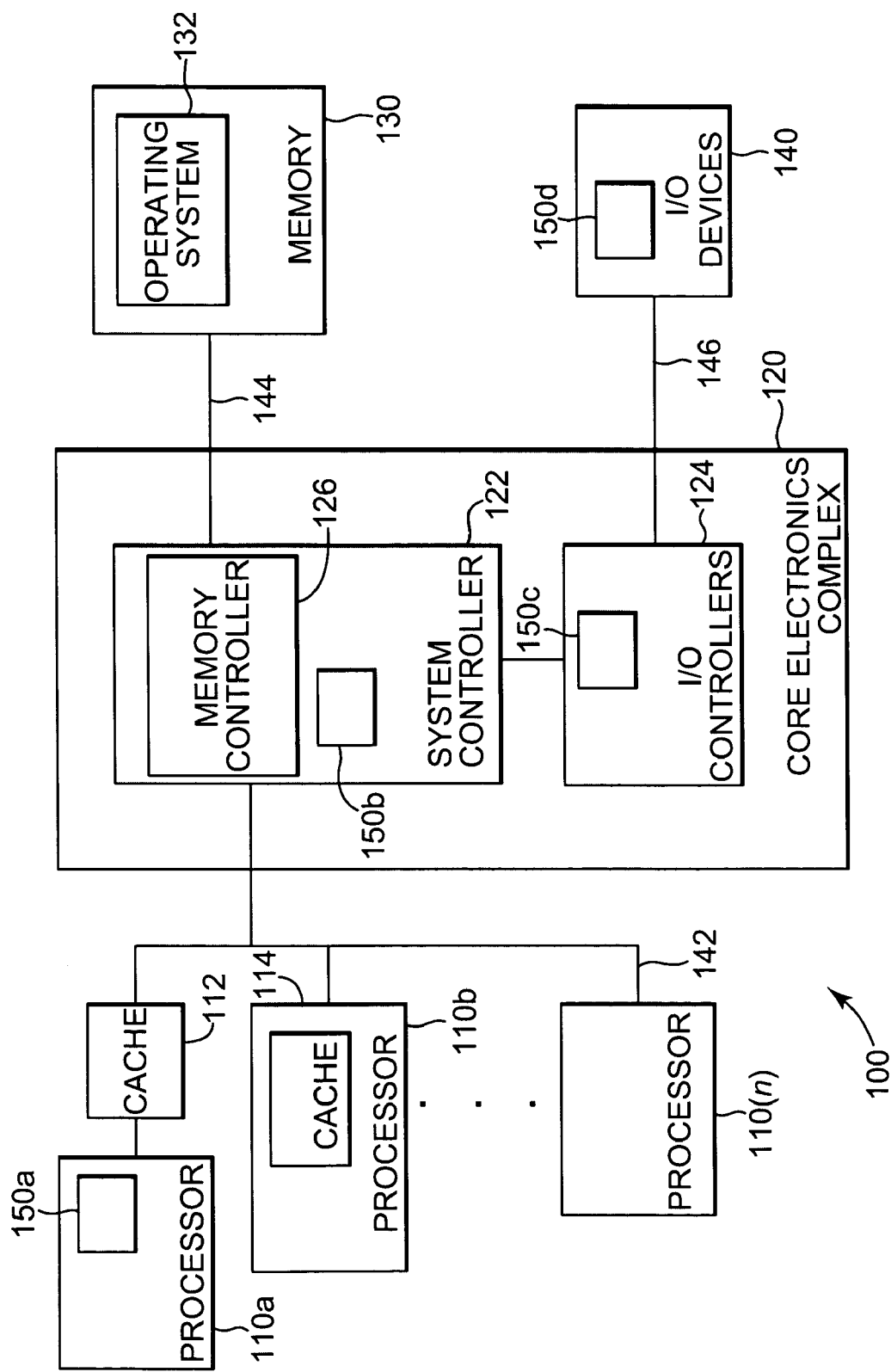
FIG. 1 is a block diagram illustrating an embodiment of a computer system that includes interconnect test modules.

FIG. 1 is a block diagram illustrating an embodiment of a computer system 100 that includes interconnect test modules 150a, 150b, 150c, and 150d. As used herein, 'interconnect test module 150' refers to any one of interconnect test modules 150a, 150b, 150c, or 150d, and 'interconnect test modules 150' refers to the set of interconnect test modules 150a, 150b, 150c, and 150d.

Computer system 100 may be any type of computer system such as a handheld, desktop, notebook, mobile, workstation, or server computer. Computer system 100 includes processors 110a through 110(n), a core electronics complex 120, a memory 130, and a set of input/output (I/O) devices 140. Processors 110a through 110(n) are each coupled to core electronics complex 120 using a set of bus connections 142. Bus connections 142 comprise a set of system busses. Core electronics complex 120 is coupled to memory 130 and I/O devices 140 using connections 144 and 146, respectively. Core electronics complex 120 may also be referred to as a chipset.

Computer system 110a includes any number of processors 110 greater than or equal to one. As used herein, 'processor 110' refers to any one of processors 110a through 110(n), and 'processors 110' refers to the set of processors 110a through 110(n).

Processor 110a is coupled to a cache 112, and processor 110b includes a cache 114. Caches 112 and 114 may store any type of information such as instructions and data. Other processors 110 may include or be operable with any type or number of caches.

Computer system 100 also includes an operating system 132 that is executable by one or more of processors 110. In response to being turned on or reset, one or more of processors 110 cause operating system 132 to be booted and executed. Processors 110 execute instructions from operating system 132 and other programs using memory 130.

Core electronics complex 120 includes a system controller 122 and a set of I/O controllers 124. System controller 122 includes a memory controller 126 which is configured to store information into and read information from memory 130 in response to write and read transactions, respectively, from processors 110 and I/O devices 140. Memory controller 126 may include hardware and/or software configured to perform memory scrubbing or other error correction functions on memory 130 in response to reading information from memory 130.

I/O controllers 124 may include any type and number of controllers configured to manage one or more I/O devices 140. Examples of I/O controllers 124 include IDE/ATA controllers, SATA controllers, PCI controllers, SCSI controllers, USB controllers, IEEE 1394 (Firewire) controllers, PCMCIA controllers, parallel port controllers, and serial port controllers. In one embodiment, I/O controllers 124 comprise multiple microchips that include an intermediate bus coupled to system controller 122, PCI controllers coupled to the intermediate bus, and SCSI, IDE and others controllers coupled to the PCI controllers. As used herein, 'I/O controller 124' refers to a single I/O controller in I/O controllers 124, and 'I/O controllers 124' refers to the set of I/O controllers 124.

Memory 130 comprises any type of memory managed by memory controller 126 such as RAM, SRAM, DRAM, SDRAM, and DDR SDRAM. In response to commands from system firmware (not shown) or operating system 132, memory controller 130 may cause information to be loaded from an I/O device 140 such as a hard drive or a CD-ROM drive into memory 130.

I/O devices 140 may include any type and number of devices configured to communicate with computer system 100 using I/O controllers 124. Each I/O device 140 may be internal or external to computer system 100 and may couple to an expansion slot in a motherboard or a connector in a chassis that houses computer system 100 that is in turn coupled to an I/O controller 124. I/O devices 140 may include a network device (not shown) configured to allow computer system 100 to communicate with other computer systems and a storage device (not shown) configured to store information. As used herein, 'I/O device 140' refers to a single I/O device in I/O devices 140, and 'I/O devices 140' refers to the set of I/O devices 140.

Interconnect test modules 150 operate to perform tests on an interconnect between two components of computer system 100 during operation, i.e., subsequent to operating system 132 being booted, of computer system 100. In the embodiment shown in FIG. 1, interconnect test modules 150*a* and 150*b* are configured to perform tests on the interconnect, i.e., system bus 142, between processor 110*a* and system controller 122. Similarly, interconnect test modules 150*c* and 150*d* are configured to perform tests on the interconnect, i.e., connection 146, between an I/O controller 124 and an I/O device 140.

Figure 2:
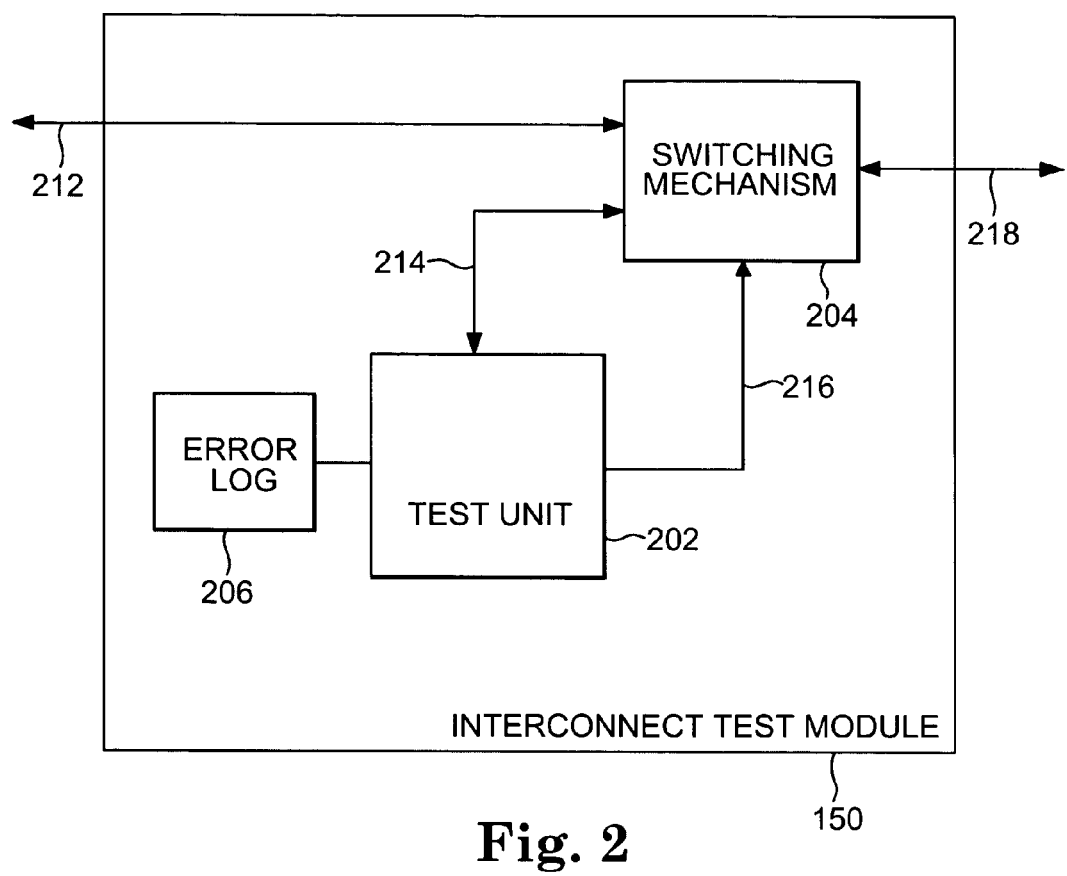
FIG. 2 is a block diagram illustrating an embodiment of an interconnect test module.

FIG. 2 is a block diagram illustrating an embodiment of interconnect test module 150. Interconnect test module 150 includes a test unit 202, a switching mechanism 204, and an error log 206. Switching mechanism 204 is coupled to a connection 212 from a component and a test connection 214 from test unit 202. Switching mechanism 204 can either be an explicit switching component in the ASIC or the functionality could be built into each of the individual ASIC I/O pads.

Test unit 202 provides a control signal 216 to switching mechanism 204 to cause either connection 212 or test connection 214 to be coupled to a connection 218. Switching mechanism 204 couples connection 218 to either connection 212 or test connection 214 in response to receiving control signal 216 from test unit 202. During normal operation, test unit 202 causes switching mechanism 204 to couple connection 212 to connection 218. In a test mode of operation, however, test unit 202 causes switching mechanism 204 to couple connection 214 to connection 218 to allow test unit 202 to perform tests on an interconnect coupled to connection 218.

Test unit 202 comprises a state machine configured to cause tests to be performed on an interconnect coupled to connection 218. The tests may include any suitable combinations of signals, referred to as test patterns, provided to and conveyed on an interconnect coupled to connection 218. A second interconnect test module 150 coupled to the interconnect receives the test patterns to determine whether an error occurred in transmitting the test patterns from the first interconnect test module 150 to the second interconnect test module 150. If an error occurs, the second interconnect test module 150 notes the failure in its error log 206. The second interconnect test module 150 also provides test patterns to the first interconnect test module 150. In response to receiving test patterns from the second interconnect test module 150, test unit 202 in the first interconnect test module 150 detects any errors and records the errors in the error log 206 of the first interconnect test module 150.

To perform tests on an interconnect, test unit 202 firsts causes computer system 100 to de-allocate components coupled to the interconnect from use by operating system 132. In one embodiment, test unit 202 accomplishes this task by sending a signal in the form of a request to operating system 132. Operating system 132 de-allocates the components and may provide a signal to test unit 202 to indicate that the components have been de-allocated. Operating system 132 may also allocate other components to at least temporarily replace those that have been de-allocated. In other embodiments, test unit 202 may cause components to be de-allocated in other ways.

After the components coupled to the interconnect have been de-allocated, test unit 202 causes tests to be performed on the interconnect in conjunction with a second test unit 202. Subsequent to or while performing the tests, test unit 202 causes operating system 132 to be notified of any errors and that the tests are complete. If any errors occur, operating system 132 may cause appropriate remedial action to be performed such as keeping the interconnect and the components coupled to it offline and notifying a system administrator. If no errors occur, operating system 132 may cause the components coupled to the interconnect to be re-allocated for use in computer system 100.

Figure 3A:
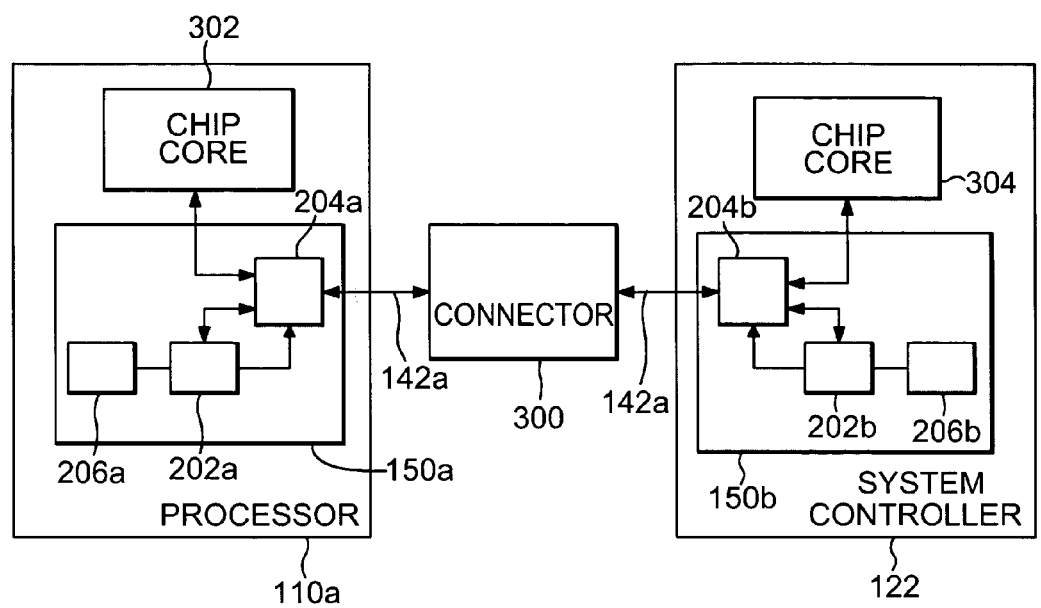
FIG. 3a is a block diagram illustrating an embodiment of selected portions of the computer system shown in FIG. 1.
Figure 3B:
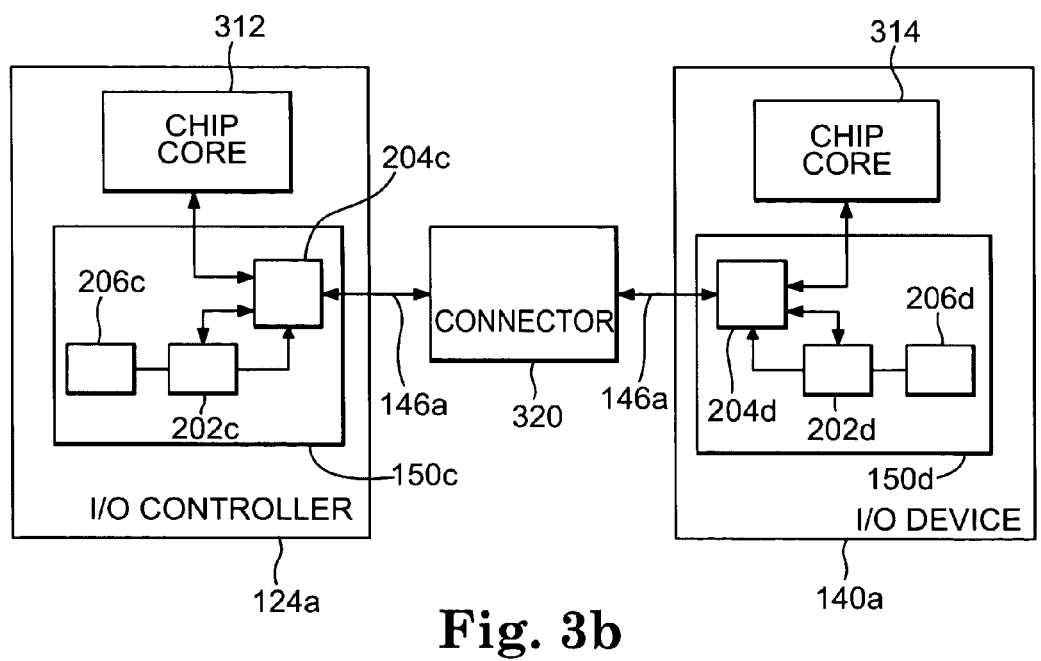
FIG. 3b is a block diagram illustrating an embodiment of selected portions of the computer system shown in FIG. 1.

FIGS. 3*a* and 3*b* are block diagrams illustrating embodiments of selected portions of the computer system shown in FIG. 1. In particular, FIGS. 3*a* and 3*b* illustrate two possible uses of interconnect test modules 150. Many other uses of interconnect test modules 150 are possible and contemplated.

In FIG. 3*a*, processor 110*a*, which includes interconnect test module 150*a*, is coupled to system controller 122, which includes interconnect test module 150*b*, through a connector 300. Connector 300 may be a socket, slot, or other connection mechanism on the motherboard (not shown) of computer system 100. Switching mechanism 204*a* is connected to a chip core 302 of processor 100*a* and a system bus 142*a* which is connected through connector 300 to switching mechanism 204*b*. Switching mechanism 204*b* is also connected to a chip core 304 of system controller 122.

During normal operation of processor 110*a* and system controller 122, test units 202*a* and 202*b* cause switching mechanisms 204*a* and 204*b*, respectively, to connect chip cores 302 and 304, respectively, to system bus 142*a*.

To test the interconnect between processor 110*a* and system controller 122, i.e., system bus 142*a* through connector 300, test units 202*a* and 202*b* cause switching mechanisms 204*a* and 204*b*, respectively, to connect test units 202*a* and 202*b*, respectively, to system bus 142*a*. Test unit 202*a* and/or 202*b* initiate testing of the interconnect by causing processor 110a and system bus 142a to be de-allocated from use by operating system 132 using operating system 132. An un-allocated processor 110 may be allocated for use in place of processor 110a during the tests.

During testing, test unit 202a generates test patterns and provides the test patterns to test unit 202b. Test unit 202b receives the test patterns and compares the received test patterns expected test patterns to determine if an error occurred. Test unit 202b stores errors that it detects in error log 206b. Similarly, test unit 202b generates test patterns and provides the test patterns to test unit 202a. Test unit 202a receives the test patterns and compares the received test patterns expected test patterns to determine if an error occurred. Test unit 202a stores errors that it detects in error log 206a. In addition to the test patterns, test units 202a and 202b may also generate and send signals to communicate with one another. Further, test units 202a and 202b may generate and send signals to operating system 132 to report errors and other test results.

Although test module 150b is shown in system controller 122 in the embodiments of FIGS. 1 and 3a, test module 150b may be included in memory controller 126 in other embodiments.

In FIG. 3b, I/O controller 124a, which includes interconnect test module 150c, is coupled to I/O device 140a, which includes interconnect test module 150d, through a connector 320. Connector 320 may be a socket, slot, or other connection mechanism on the motherboard (not shown) of computer system 100. Switching mechanism 204c is connected to a chip core 312 of I/O controller 124a and a bus 146a which is connected through connector 320 to switching mechanism 204d. Switching mechanism 204d is also connected to a chip core 314 of I/O device 140a.

During normal operation of I/O controller 124a and I/O device 140a, test units 202c and 202d cause switching mechanisms 204c and 204d, respectively, to connect chip cores 312 and 314, respectively, to bus 146.

To test the interconnect between I/O controller 124a and I/O device 140a, i.e., bus 146a through connector 320, test units 202c and 202d cause switching mechanisms 204c and 204d, respectively, to connect test units 202c and 202d, respectively, to bus 146a. Test unit 202c and/or 202d initiate testing of the interconnect by causing I/O device 140a and system bus 146a to be de-allocated from use by operating system 132 using operating system 132.

During testing, test unit 202c generates test patterns and provides the test patterns to test unit 202d. Test unit 202d receives the test patterns and compares the received test patterns expected test patterns to determine if an error occurred. Test unit 202d stores errors that it detects in error log 206d. Similarly, test unit 202d generates test patterns and provides the test patterns to test unit 202c. Test unit 202c receives the test patterns and compares the received test patterns expected test patterns to determine if an error occurred. Test unit 202c stores errors that it detects in error log 206c. In addition to the test patterns, test units 202c and 202d may also generate and send signals to communicate with one another. Further, test units 202c and 202d may generate and send signals to operating system 132 to report errors and other test results.

Figure 4:
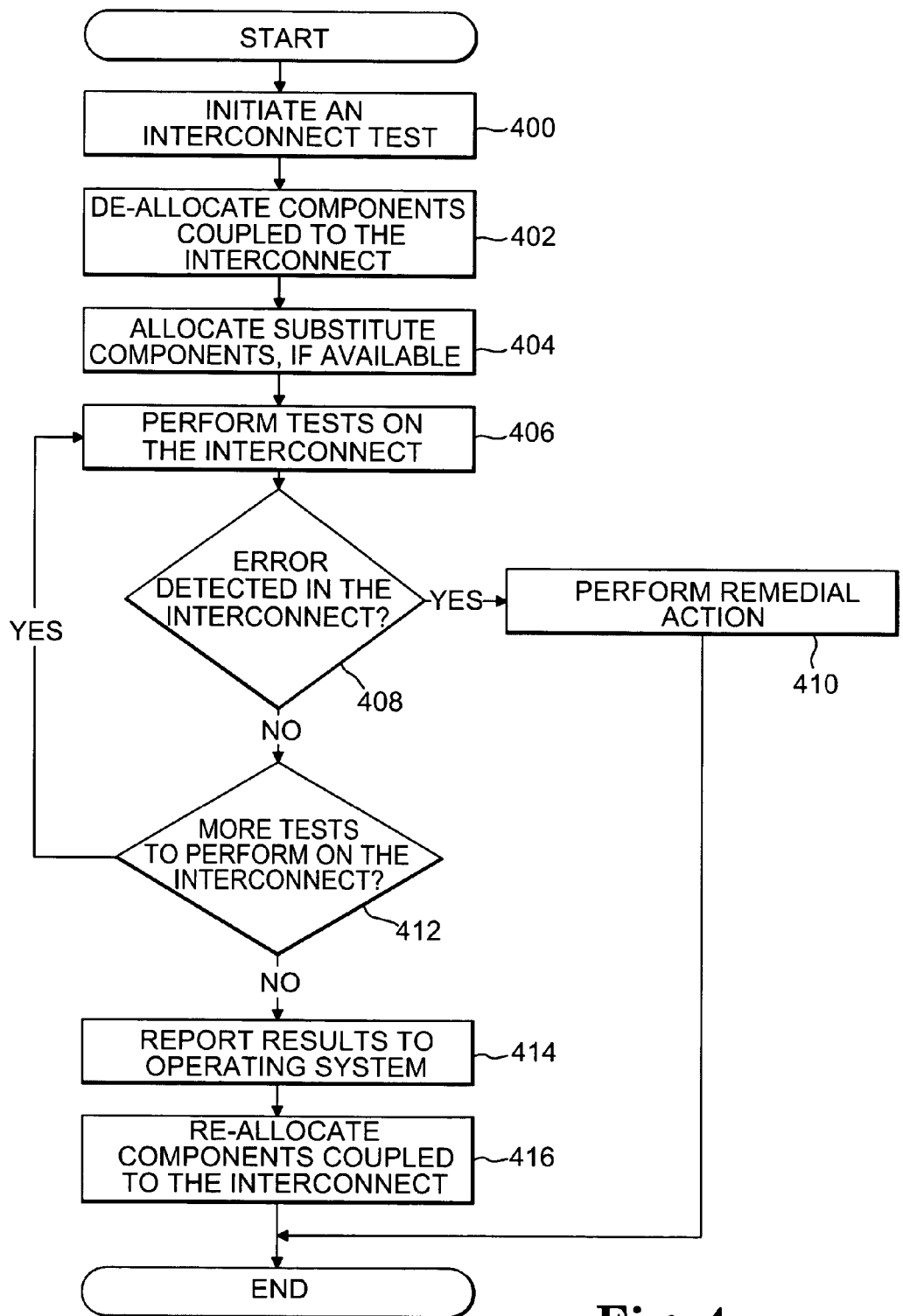
FIG. 4 is a flow chart illustrating an embodiment of a method for testing an interconnect during operation of a computer system.

FIG. 4 is a flow chart illustrating an embodiment of a method for testing an interconnect during operation of computer system 100 using interconnect test module 150. An interconnect test is initiated by operating system 132 or interconnect test module 150 as indicated in a block 400. Interconnect tests may be scheduled periodically and may be scheduled in response to selections made by user interacting with operating system 132.

One or more components coupled to the interconnect are de-allocated from use by operating system 132 as indicated in a block 402. As noted above, interconnect test module 150 may send a request or other signal to operating system 132 to cause the component or components to be de-allocated. Operating system 132 may respond by providing a signal back to interconnect test module 150 to indicate that the component(s) have been de-allocated, i.e., that the interconnect is available for testing by interconnect test module 150. Substitute components are allocated to replace the de-allocated components, if available, as indicated in a block 404.

Tests are performed on the interconnect by interconnect test module 150 as indicated in a block 406. Interconnect test module 150 performs tests by generating test patterns and providing the test patterns across the interconnect to a second interconnect test module 150 as shown in FIGS. 1, 3a, and 3b. A determination is made as to whether an error has been detected on the interconnect by interconnect test module 150 as indicated in a block 408. To detect an error, the second interconnect test module 150 compares received test patterns to expected test patterns. If an error has been detected on the interconnect, then remedial action, such as notifying operating system 132 and the other interconnect test module 150, taking the components coupled to the interconnect offline, and notifying a system administrator, is performed as indicated in a block 410.

If no error has been detected on the interconnect, then a determination is made as to whether there are more tests to perform on the interconnect as indicated in a block 412. If there are more tests to be performed on the interconnect, then the function of block 406 is repeated as indicated. If there are no more tests to be performed on the interconnect, then results are reported to operating system 132 by interconnect test module 150 as indicated in a block 414. The components coupled to the interconnect are re-allocated as indicated in a block 416.

In the embodiments described herein, interconnect test module 150 and the components therein may comprise hardware, software, or any combination of hardware and software.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer system comprising:
   an operating system;
   a first component that comprises a first test module, the first test module including a first error log configured to be written by the first test module;
   a second component that comprises a second test module, the second test module including a second error log configured to be written by the second test module; and
   an interconnect coupling the first component and the second component;
   wherein the first test module is configured to provide a first signal to the operating system to cause the second component to be de-allocated from use by the operating system, and wherein the first test module is configured to provide a first test pattern to the second test module on the interconnect in response to a second signal from the operating system.

2. The computer system of claim 1 wherein the second test module is configured to detect an error on the interconnect in response to receiving the first test pattern.

3. The computer system of claim 1 wherein the second test module is configured to provide a second test pattern to the first test module.

4. The computer system of claim 3 wherein the first test module is configured to detect an error on the interconnect in response to receiving the second test pattern.

5. The computer system of claim 1 wherein the operating system is configured to provide the second signal to the first test module in response to detecting the first signal from the first test module.

6. The computer system of claim 5 further comprising:
a processor configured to cause the operating system to be booted;
wherein the first test module is configured to generate the first signal subsequent to the operating system being booted.

7. The computer system of claim 1 wherein the first component comprises a processor, and wherein the second component comprises a controller coupled to the processor.

8. The computer system of claim 7 wherein the controller comprises a system controller.

9. The computer system of claim 7 wherein the controller comprises a memory controller.

10. The computer system of claim 1 wherein the first component comprises an input/output (I/O) controller, and wherein the second component comprises an input/output (I/O) device coupled to the I/O controller through an expansion slot.

11. A method performed by a first interconnect test module in a first component coupled to an interconnect in a computer system, the method comprising:
causing a second component coupled to the interconnect to be de-allocated from use by an operating system, the second component including a second interconnect test module with an error log configured to written by the second interconnect test module;
performing a test on the interconnect subsequent to the second component being de-allocated from use by the operating system; and
notifying the operating system in response to detecting an error in performing the test.

12. The method of claim 11 further comprising:
causing the second component to be re-allocated to use by the operating system subsequent to performing the test.

13. The method of claim 11 further comprising:
reporting results of the test to the operating system.

14. The method of claim 11 further comprising:
performing the test on the interconnect by providing test patterns on the interconnect.

15. A system comprising:
a processor configured to cause an operating system to be booted;
an interconnect;
a first test unit coupled to the interconnect;
a second test unit coupled to the interconnect;
a first error log configured to be written by the firet test unit; and
a second error log configured to be written by the second test unit;
wherein the first test unit is configured to provide a test pattern to the second test unit subsequent to the processor booting the operating system, and wherein the second test unit is configured to detect an error in the interconnect in response to receiving the test pattern.

16. The system of claim 15 further comprising:
a first switching mechanism coupled to the first test unit; and
a second switching mechanism coupled to the second test unit;
wherein the first test unit is configured to cause the first switching mechanism to connect the first test unit to the interconnect, and wherein the second test unit is configured to cause the second switching mechanism to connect the second test unit to the interconnect.

17. The system of claim 16 further comprising:
a first component coupled to the first switching mechanism; and
a second component coupled to the second switching mechanism;
wherein the first test unit is configured to cause the first switching mechanism to disconnect the first component from the interconnect, and wherein the second test unit is configured to cause the second switching mechanism to disconnect the second component from the interconnect.

* * * * *

UNITED STATES PATENT AND TRADEMARK OFFICE
CERTIFICATE OF CORRECTION

PATENT NO.        : 7,072,788 B2
APPLICATION NO.   : 10/727440
DATED             : July 4, 2006
INVENTOR(S)       : Ken G. Pomaranski et al.

It is certified that error appears in the above-identified patent and that said Letters Patent is hereby corrected as shown below:

IN THE CLAIMS

Claim 15, Column 8, line 16, delete "firet" and insert therefor --first--

Signed and Sealed this

Sixteenth Day of October, 2007

JON W. DUDAS
*Director of the United States Patent and Trademark Office*